United States Patent [19]

Herb

[11] 4,427,327
[45] Jan. 24, 1984

[54] ANCHOR BOLT INCLUDING ELONGATED SPREADER WEDGE

[75] Inventor: Armin Herb, Peissenberg, Fed. Rep. of Germany

[73] Assignee: Hilti Aktiengesellschaft, Liechtenstein

[21] Appl. No.: 263,170

[22] Filed: May 13, 1981

[30] Foreign Application Priority Data

May 16, 1980 [DE] Fed. Rep. of Germany ....... 3018875

[51] Int. Cl.³ ............................................. F16B 13/04
[52] U.S. Cl. ........................................ 411/78; 411/79; 411/56; 405/259
[58] Field of Search .................................. 411/75–80, 411/44, 55–57; 405/259

[56] References Cited

U.S. PATENT DOCUMENTS 1,251,566  1/1918  Pigott ..................................... 411/78
3,680,430  8/1972  Cannon et al.
4,275,637  6/1981  Herb et al. ............................ 411/78

FOREIGN PATENT DOCUMENTS 112718  4/1966  Netherlands ........................ 405/259

*Primary Examiner*—Gary L. Smith
*Assistant Examiner*—Neill Wilson
*Attorney, Agent, or Firm*—Toren, McGeady and Stanger

[57] ABSTRACT

An axially elongated fastening element is made up of an anchor bolt and a spreader wedge each having a wedge surface. Initially the two parts are inserted in the unspread condition into a borehole. By providing relative movement in the axial direction between the wedge surfaces, the fastening element is anchored in the borehole. The wedge surfaces are divided into at least two portions each disposed at a different angle relative to the axis of the fastening element. The initial spreading action is effected when the portion of the wedge surfaces having smaller angles slide relative to one another.

6 Claims, 5 Drawing Figures

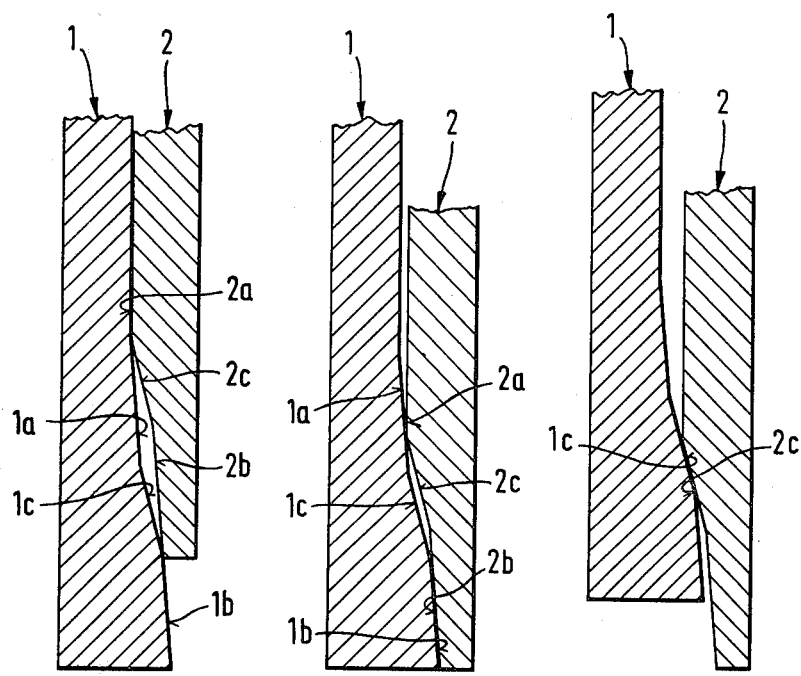

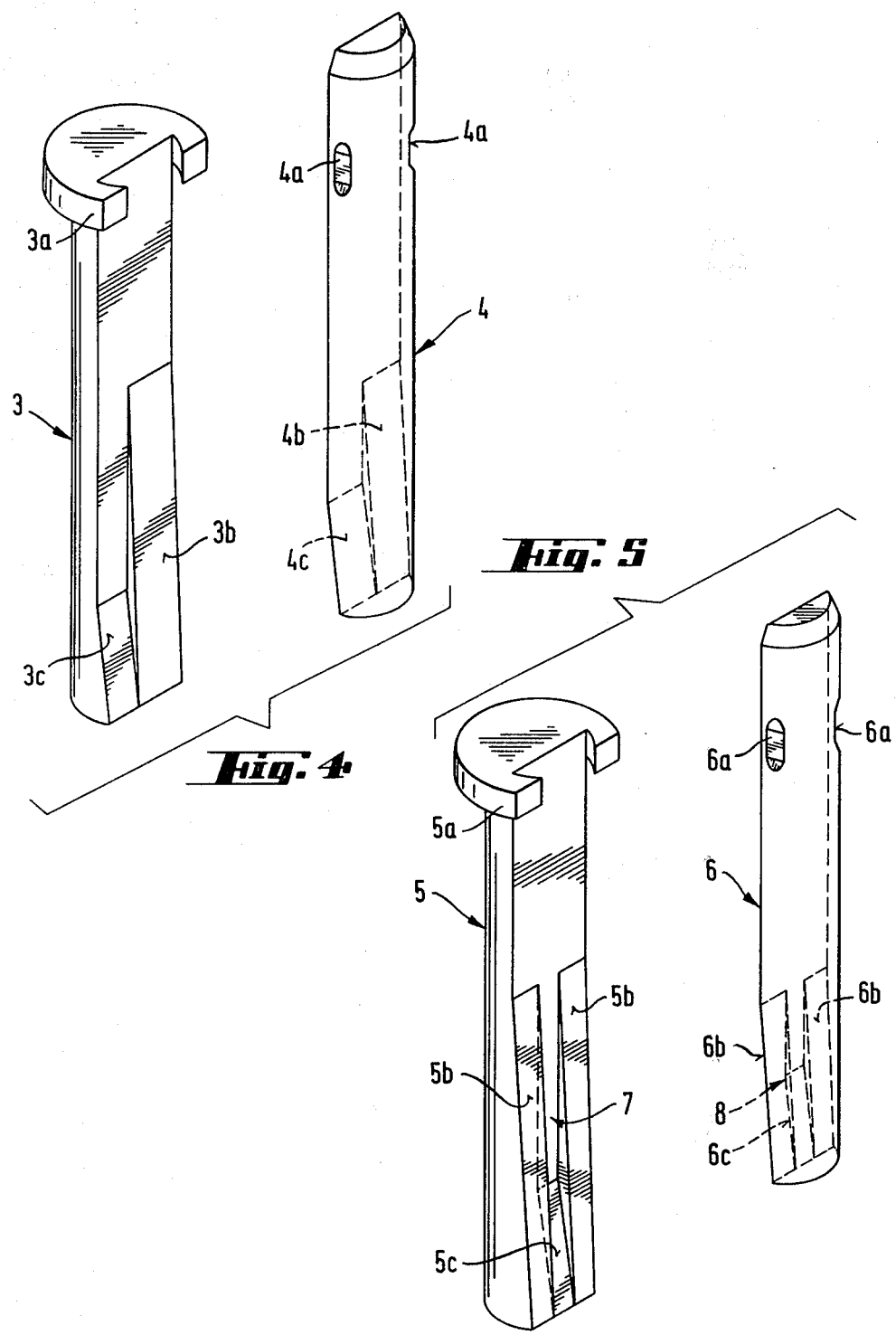

ANCHOR BOLT INCLUDING ELONGATED SPREADER WEDGE

SUMMARY OF THE INVENTION

The present invention is directed to a fastening element made up of an anchor bolt and a spreader wedge with the trailing end of the anchor bolt provided with a contact member, such as a flange, for applying a load. The anchor bolt has a wedge surface which slopes toward the peripheral outline of the fastening element adjacent the leading end of the anchor bolt. The spreader wedge slides relative to the anchor bolt wedge surface for effecting the spreading or anchoring of the element. In the unspread condition, the anchor bolt and spreader wedge combine to provide a circular cross-section.

Fastening elements of this type are usually arranged in rows, such as for supporting hung ceilings or the like. It is possible that the borehole drilled to receive the fastening element may be too large or cracks may develop in the region of the borehole. When such conditions occur, insufficient anchorage values are attained with the known fastening elements. It is possible that a number of failures may occur with the fastening elements unable to be anchored in the boreholes. When such a situation arises, the anchorage of the overall structure is endangered.

Therefore, it is the primary object of the present invention to provide a fastening element which can be anchored over a larger diameter range.

In accordance with the present invention, the wedge surfaces are divided into separate parts each having a different angle relative to the axis of the fastening element.

Due to the different slope angles of the wedge surfaces, the spreading behavior of the fastening element can be adapted to the varying conditions. It is possible to carry out the spreading operation in several steps. The spreading distances may be limited by creating a stop, for instance a projection or the like. In technical language this is called a "distance-limited spreading."

It is advantageous in the creation of a stop when, during spreading, the spreader wedge first comes to rest along a wedge surface part with a smaller slope angle relative to the fastening element axis. As the fastening element or dowel is being anchored, and the spreader wedge starts to slide along the wedge surface part having a larger slope angle there results a stop with a clearly noticeable increase in resistance against the displacement of the spreader wedge inwardly into the borehole.

The larger slope angle may be close to 90° so that a firm stop is created.

During extreme stress, cracks occasionally develop in the material in which the borehole is drilled. When such cracks extend into the region of the borehole, a drastic change in the borehole diameter results. In such a situation the second spreading step is effective. With the spreader wedge sliding over the wedge surface having the larger slope angle a significant radial expansion occurs for a small axial displacement. Accordingly, the fastening element is prevented from being torn out of the borehole.

There are a number of different possibilities for arranging the wedge surface parts. It has been proven to be especially advantageous when the wedge surface parts are arranged one behind the other in the axial direction of the fastening element. A greater post-spreading effect is obtained when the wedge surface parts are located one after the other. Further, for production purposes the series arrangement of the wedge surface parts is especially simple.

For a compact construction of the fastening element or dowel it is advantageous if the wedge surface parts are arranged next to one another. Such an arrangement is especially suitable for larger fastening elements. Further, with the wedge surface parts in side-by-side relationship, the point in time when the wedge surface parts come in contact can be exactly determined. This arrangement, however, presents some manufacturing problems.

In principle, it is possible to provide a plurality of wedge surface parts. In practical experience, however, it has proven to be advantageous if two surface parts are provided each with a different slope angle. In such an arrangement, the two slope angles of the wedge surface parts can be better adjusted to one another. The use of two wedge surface parts is especially advantageous for manufacturing purposes.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a partial sectional view of a two-part fastening element or dowel embodying the present invention with the fastening element shown in the unspread condition;

FIG. 2 is a partial sectional view similar to FIG. 1, however, with the fastening element shown in the spread condition;

FIG. 3 is a partial sectional view similar to FIG. 1, however, with the fastening element shown in a further spreading phase as compared to FIG. 2;

FIG. 4 is a perspective view of a two part fastening element embodying the present invention with the parts shown separated from one another; and FIG. 5 is a perspective view of still another two-part fastening element embodying the present invention with the parts shown spaced apart.

DETAIL DESCRIPTION OF THE INVENTION

In FIGS. 1, 2 and 3, a fastening element or dowel is made up of an anchor bolt 1 and a spreader bolt 2. As viewed in these three figures the lower ends of each part is its leading end, that is, the end which is first inserted into a borehole into which the fastening element dowel is to be secured. The trailing end would be the upper end, however, it is not shown in these figures. The fastening element is an axially elongated member as are the anchor bolt 1 and the spreader wedge 2. In addition to the anchor bolt surfaces extending substantially parallel to the axis of the fastening element, anchor bolt 1 has three wedge surface parts 1a, 1b and 1c arranged at different slope angles relative to the axis of the anchor bolt or fastening element. The slope angle of wedge surface part 1a is the same as the slope angle of wedge surface 1b. Wedge surface parts 1a and 1b are spaced apart in the axial direction of the fastening element and wedge surface part 1c extends between them and has a greater slope angle than the slope angle of the wedge surface parts 1a, 1b. Spreader wedge 2 has a sliding surface 2a extending parallel to the axis of the fastening element and two wedge surface parts 2b and 2c. The slope angle of wedge surface part 2b correspond to the slope angle of the wedge surface part 1a and 1b of the anchor bolt 1. Wedge surface part 2c is located in the axial direction between the surface 2a and the wedge surface part 2b and wedge surface part 2c has the same slope angle as wedge surface part 1c of the anchor bolt 1. During the spreading or anchoring operation, the leading end part of sliding surface 2a and the leading end part of wedge surface 2b commence engagement with the wedge surface parts 1a and 1b of the anchor bolt 1.

In FIG. 2 the fastening element is shown in the spread condition with the spreader wedge 2 displaced axially from its position in the unspread condition shown in FIG. 1. The spreader wedge 2 has been driven into the borehole until its leading end is flush with the leading end of the anchor bolt. During the movement of the spreader wedge 2, the leading end of sliding surface 2a moves along wedge surface part 1a and wedge surface part 2b slides along wedge surface part 1b. During the movement of the spreader wedge 2 relative to the anchor bolt 1 the wedge surface parts 1c, 2c have not yet begun to contact one another. If a load is applied to the trailing end of the anchor bolt 1, as shown in FIG. 3 the anchor bolt moves out of the borehole relative to the spreader wedge 2, that is, the leading end of the anchor bolt moves rearwardly away from the leading end of the spreader wedge. During such movement, the wedge surface parts 1c, 2c, which have larger slope angles than the other wedge surface parts, contact one another. Due to the larger slope angle of these wedge surface parts 1c, 2c, as the anchor bolt 1 moves in the axial direction relative to the spreader wedge 2, a greater radial expansion of the fastening element results. During the rearward movement of the anchor bolt 1 relative to the spreader wedge 2, the wedge surface parts 1c, 2c slide on one another.

In the unspread condition of the fastening element or dowel the circumferential peripheral surfaces of the anchor bolt 1 and the spreader wedge 2 define a circular cross-section, however, as the anchor bolt and spreader wedge are moved relative to one another as the fastening element assumes the spread condition, the displacement of the two parts causes a change in the defined cross-section so that it is no longer circular.

In FIG. 4 another embodiment of the fastening element or dowel embodying the present invention is illustrated. This fastening element is formed by an anchor bolt 3 and a spreader wedge 4. Anchor bolt 3 has a flange at its trailing end with extensions 3a. The flange projects laterally outwardly from the body of the anchor bolt and the extensions 3a project outwardly from the surface of the bolt which extends generally parallel to the axis of the fastening element. When the fastening element is placed into a borehole, the flange and the extensions 3a serve as a stop. The wedge surface on the anchor bolt 3 is made up of two wedge surface parts 3b, 3c. Unlike the serially arranged wedge surface parts in FIGS. 1–3, in FIG. 4, the wedge surface part 3b, 3c are arranged side-by-side, that is, they are axially coextensive. The slope angle of wedge surface part 3b with respect to the axis of the fastening element is smaller than the slope angle of wedge surface part 3c. The wedge surface part 3b commences at a location closer to the trailing end of the anchor bolt than does the wedge surface part 3c. Spreader wedge 4 has recesses 4a adjacent its trailing end so that the extensions 3a on the bolt fit into the recesses connecting the two parts together in a detachable manner with the extensions 3a serving as guides as the spreader wedge is driven relative to the anchor bolt. The wedge surface of spreader wedge 4 extending from its leading end toward the trailing end is made up of wedge surface parts 4b, 4c each having a different slope angle. The starting point of the wedge surface parts are offset in the axial direction of the spreader wedge so that wedge surface part 4b having the smaller slope angle contacts the corresponding wedge surface part 3b of the anchor bolt before the wedge surface part 4c with the larger slope angle contacts its corresponding wedge surface part 3c on the anchor bolt.

In FIG. 5 another fastening element embodying the present invention is exhibited and consists of an anchor bolt 5 and a spreader wedge 6. At its trailing end, anchor bolt 5 has a flange and flange extensions 5a in the same general arrangement as shown in FIG. 4. Adjacent its trailing end, spreader wedge 6 has recesses 6a for receiving the extensions 5a so that a detachable connection is afforded between the anchor bolt 5 and the spreader wedge 6. The anchor bolt 5 starting from its leading end has a wedge surface including two axially extending wedge surface parts 5b spaced laterally apart from one another. The lateral spacing between the wedge surface parts 5b defines a slot 7 with the base of the slot having a wedge surface part 5c extending from the leading end of the anchor bolt, however, the axial length of the wedge surface part 5c is considerably less than that of the two wedge surface parts 5b. In a similar arrangement, the spreader wedge 6 has two wedge surface parts 6b each with the same relatively flat slope angle with a projection 8 formed between the laterally spaced wedge surface parts 6b. The portion of the projection 8 extending from the leading end of the spreader wedge has a steeper slope angle. As can be seen in FIG. 5, starting from the trailing end of the spreader wedge 6, the ends of the wedge surface parts 6b are encountered before reaching the end of the wedge surface part 6c. Accordingly, as the spreader wedge moves relative to the anchor bolt with the leading end of the spreader wedge approaching the leading end of the anchor bolt, the wedge surface parts 5b, 6b first come into contact and after further axial displacement the wedge surface parts 5c, 6c begin to contact one another.

While specific embodiments of the invention have been shown and described in detail to illustrate the application of the inventive principles, it will be understood that the invention may be embodied otherwise without departing from such principles.

I claim:

1. Fastening element comprising an axially elongated anchor bolt and an axially elongated spreader wedge each having a leading end and a trailing end spaced apart in the axial direction thereof with the leading end being inserted first into a borehole or the like into which said fastening element is to be anchored, said anchor bolt including means adjacent the trailing end thereof for applying a load to said fastening element, said anchor bolt and spreader wedge when inserted into a borehole have an unspread condition and a spread condition, in the unspread condition the leading ends of said anchor bolt and spreader wedge are spaced axially apart and the circumferential peripheral surface of said anchor bolt and spreader wedge combine to define a circular cross-section, said anchor bolt having a wedge surface extending in the axial direction thereof, said fastening element commences to be spread as said spreader wedge moves axially relative to said anchor bolt from the unspread condition with the leading end thereof approaching the leading end of said anchor bolt and with said spreader wedge sliding over the wedge surface of said anchor bolt, and with the circumferential peripheral surfaces of the combined said anchor bolt and spreader wedge departing from a circular cross-section, and said wedge surface is divided into at least a first wedge surface part and a second wedge surface part with said first and second parts each having a different slope angle relative to the axis of said anchor bolt, said first and second wedge surfaces located on the exterior surface of said anchor bolt and each commencing at a different axial dimension from the trailing end of said anchor bolt, said first wedge surface part having a smaller slope angle than said second wedge surface part and as said spreader wedge moves from the unspread condition to the spread condition of said fastening element said spreader wedge first contacts said first wedge surface part of said anchor bolt.

2. Fastening element, as set forth in claim 1, wherein said spreader wedge having a first wedge surface part and a second wedge surface part with said first wedge surface part of said spreader wedge having a smaller slope angle relative to the axial direction of said spreader wedge than said second wedge surface part of said spreader wedge, and said first and second wedge surface parts of each of said anchor bolt and spreader wedge being located one following the other in the axial direction of said fastening element with said first wedge surface parts being located closer to the trailing ends of said anchor bolt and spreader wedge than said second wedge surface parts.

3. Fastening element, as set forth in claim 1, wherein said spreader wedge having a first wedge surface part and a second wedge surface part with said first wedge surface part of said spreader wedge having a slope angle relative to the axial direction of said spreader wedge smaller than the slope angle of said second wedge surface part, and said first and second wedge surface parts on said anchor bolt and spreader wedge being axially coextensive for at least a portion of the axial lengths thereof.

4. Fastening element, as set forth in claim 3, wherein said anchor bolt and said spreader wedge having two said first wedge surface parts extending coaxially and spaced laterally apart, one of said anchor bolt and said spreader wedge forming a recess between said first wedge surface parts and the other one of said anchor bolt and said spreader wedge forming a projection between said first wedge surface parts, and a part of the axial length of said projection and of said slot forming said second wedge surface part from the leading end of said anchor bolt and said spreader wedge with the axial length of said second wedge surface parts being less than the axial length of said first wedge surface parts.

5. Fastening element, as set forth in claim 1, including means for detachably interconnecting said anchor bolt and said spreader wedge.

6. Fastening element, as set forth in claim 2, wherein said anchor bolt having one said first wedge surface part closer to the trailing end of said anchor bolt followed in the axial direction by one said second wedge surface part and with another said first wedge surface part spacing said second wedge surface part from the leading end of said anchor bolt, and said spreader wedge having one said first wedge part extending axially from the leading end thereof followed by one said second wedge surface part extending from said first wedge surface part toward the trailing end of said spreader wedge.

* * * * *